(12) United States Patent
Yamada et al.

(10) Patent No.: US 7,861,994 B2
(45) Date of Patent: Jan. 4, 2011

(54) SEAT ADJUSTMENT APPARATUS OF VEHICLE

(75) Inventors: Yukifumi Yamada, Toyota (JP); Yasuhiro Kojima, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 496 days.

(21) Appl. No.: 12/066,985

(22) PCT Filed: Oct. 12, 2006

(86) PCT No.: PCT/JP2006/320385
§ 371 (c)(1),
(2), (4) Date: Mar. 14, 2008

(87) PCT Pub. No.: WO2007/049463
PCT Pub. Date: May 3, 2007

(65) Prior Publication Data
US 2009/0261224 A1 Oct. 22, 2009

(30) Foreign Application Priority Data
Oct. 24, 2005 (JP) .............................. 2005-308867

(51) Int. Cl.
*F16M 13/00* (2006.01)
(52) U.S. Cl. .............. 248/421; 297/344.13; 297/344.15
(58) Field of Classification Search ................. 248/415, 248/421, 429, 424; 297/344.15, 344.13, 297/344.12
See application file for complete search history.

(56) References Cited

U.S. PATENT DOCUMENTS

| | | | | | |
|---|---|---|---|---|---|
| 4,121,802 | A | * | 10/1978 | Kluting et al. | 248/421 |
| 4,128,225 | A | * | 12/1978 | Kluting et al. | 248/421 |
| 4,325,527 | A | * | 4/1982 | Berneking | 248/394 |
| 4,611,778 | A | * | 9/1986 | Werner et al. | 248/429 |
| 4,702,454 | A | * | 10/1987 | Izumida | 248/585 |
| 4,871,137 | A | * | 10/1989 | Ikegaya | 248/396 |
| 6,095,475 | A | * | 8/2000 | Willms et al. | 248/421 |

FOREIGN PATENT DOCUMENTS

| JP | 10 95255 | 4/1998 |
|---|---|---|
| JP | 2002 321551 | 11/2002 |
| JP | 2003 237433 | 8/2003 |

* cited by examiner

*Primary Examiner*—Kimberly T Wood
(74) *Attorney, Agent, or Firm*—Oblon, Spivak, McClelland, Maier & Neustadt, L.L.P.

(57) ABSTRACT

A seat adjustment apparatus of a vehicle that prevents a torque rod from falling off. A torque rod is rotatably supported by through holes, which are provided in a left base frame. The torque rod pivots with respect to base frames through pivoting of rear lifter links. A metal hook member is secured to the torque rod. The metal hook member includes a first engagement portion, second engagement portions, and a third engagement portion. The first engagement portion is passed through the torque rod and engaged with a torsion bar. The second engagement portions are engaged with the torque rod. The third engagement portion is provided at a position radially outward from the second engagement portions and engaged with the left base frame. The torsion bar is fixed to the torque rod through the metal hook member.

8 Claims, 3 Drawing Sheets

SEAT ADJUSTMENT APPARATUS OF VEHICLE

FIELD OF THE INVENTION

The present invention relates to a seat adjustment apparatus of a vehicle.

BACKGROUND OF THE INVENTION

Conventionally, a vehicle seat adjustment apparatus may be provided in a seat of a vehicle to adjust the height of the seat cushion. For example, as described in Patent Document 1, a seat adjustment apparatus of a vehicle includes two pairs of lifter links that support a seat cushion. The lifter links of each of the pairs are arranged below the seat cushion and spaced from each other along the direction of the width of the seat cushion. The pair of the lifter links that are located at front positions are connected together through a cylindrical torque rod. The torque rod is passed through a through hole extending through an upper rail, which is arranged below the seat cushion. The lifter links that are located at the front positions are thus pivoted with the torque rod rotating with respect to the upper rail. This selectively raises and lowers the seat cushion.

A torsion bar is received in the torque rod. Elastic force produced by the torsion bar applies torque to the torque rod. The torque acts on the lifter links as assistance force that acts to raise the seat cushion. In other words, the assistance force applied from the torque rod to the lifter links facilitates raising of the seat cushion.

Patent Document 1: Japanese Laid-Open Patent Publication No. 10-095255.

SUMMARY OF THE INVENTION

In the above-described seat adjustment apparatus of a vehicle, the torque rod is passed through the through hole and supported rotatably. Thus, if load acts on the seat in the direction of the width of the vehicle, the torque rod may move axially with respect to the upper rail and fall off the through hole.

Accordingly, it is an objective of the present invention to provide a seat adjustment apparatus of a vehicle that prevents a torque rod from falling off.

To achieve the foregoing objective and in accordance with one aspect of the present invention, a seat adjustment apparatus of a vehicle is provided. The apparatus includes two pairs of lifter links, a cylindrical torque rod, a torsion bar, and a coupling member. The two pairs of lifter links extend along a direction of a width of a seat cushion and are spaced at a predetermined interval in a forward-rearward direction. The lifter links support the seat cushion and operating to selectively raising and lowering the seat cushion. The cylindrical torque rod extends along the direction of the width of the seat cushion. The torque rod is rotatably supported by a rotation support provided in one of the seat cushion and a base member arranged below the seat cushion. The torque rod interlocks the lifter links in one pair of the two pairs of the lifter links with each other. The torsion bar is passed through the torque rod and has a first end and a second end. The first end is fixed to one of the seat cushion and the base member. The torsion bar urges the lifter link corresponding to the second end in a direction in which the seat cushion is raised. The coupling member has a first engagement portion passed through the torque rod and engaged with the torsion bar, a second engagement portion received in a slit groove extending from an end surface of the torque rod and engaged with the torque rod, and a third engagement portion arranged at a position radially outward from the second engagement portion and engaged with the rotation support.

In the apparatus, the rotation support and the connecting member, which is arranged closer to the distal end of the torque rod than the rotation support, are engaged with each other. This prevents the rotation support from moving closer to the distal end of the torque rod than the coupling member. The torque rod is thus prevented from falling off.

The second end of the torsion bar may be formed substantially in a U shape. The first engagement portion is arranged in the space defined by the second end. Such arrangement of the first engagement portion causes engagement between the first engagement portion and the second end. This allows engagement between the torsion bar and the torque rod without fixing the torsion bar to the torque rod with adhesive or through welding. The torsion bar and the torque rod are thus easily assembled.

The slit groove of the torque rod may be shaped in such a manner as to become engaged with the coupling member. Such engagement between the coupling member and the slit groove prevents movement of the coupling member toward the distal end of the torque rod. The rotation support is thus further reliably prevented from moving closer to the distal end of the torque rod than the coupling member.

The slit groove of the torque rod may be shaped in such a manner as to become spaced from an end surface of the torque rod along an urging direction of the torsion bar. In this case, urging force produced by the torsion bar acts to guide the coupling member to the slit groove, moving the coupling member inwardly with respect to the torque rod. As a result, the restoring of the torsion bar prevents the coupling member from moving closer to the distal end of the torque rod.

The third engagement portion of the coupling member may be formed in an arcuate shape and along the outer circumferential surface of the torque rod. In this case, the coupling member is easily held by the outer circumference of the torque rod when the coupling member is assembled with the torque rod. This facilitates the assembly of the coupling member.

DETAILED DESCRIPTION OF THE PREFERRED EMBODIMENTS

An embodiment of the present invention will now be described with reference to the attached drawings.

Figure 1:
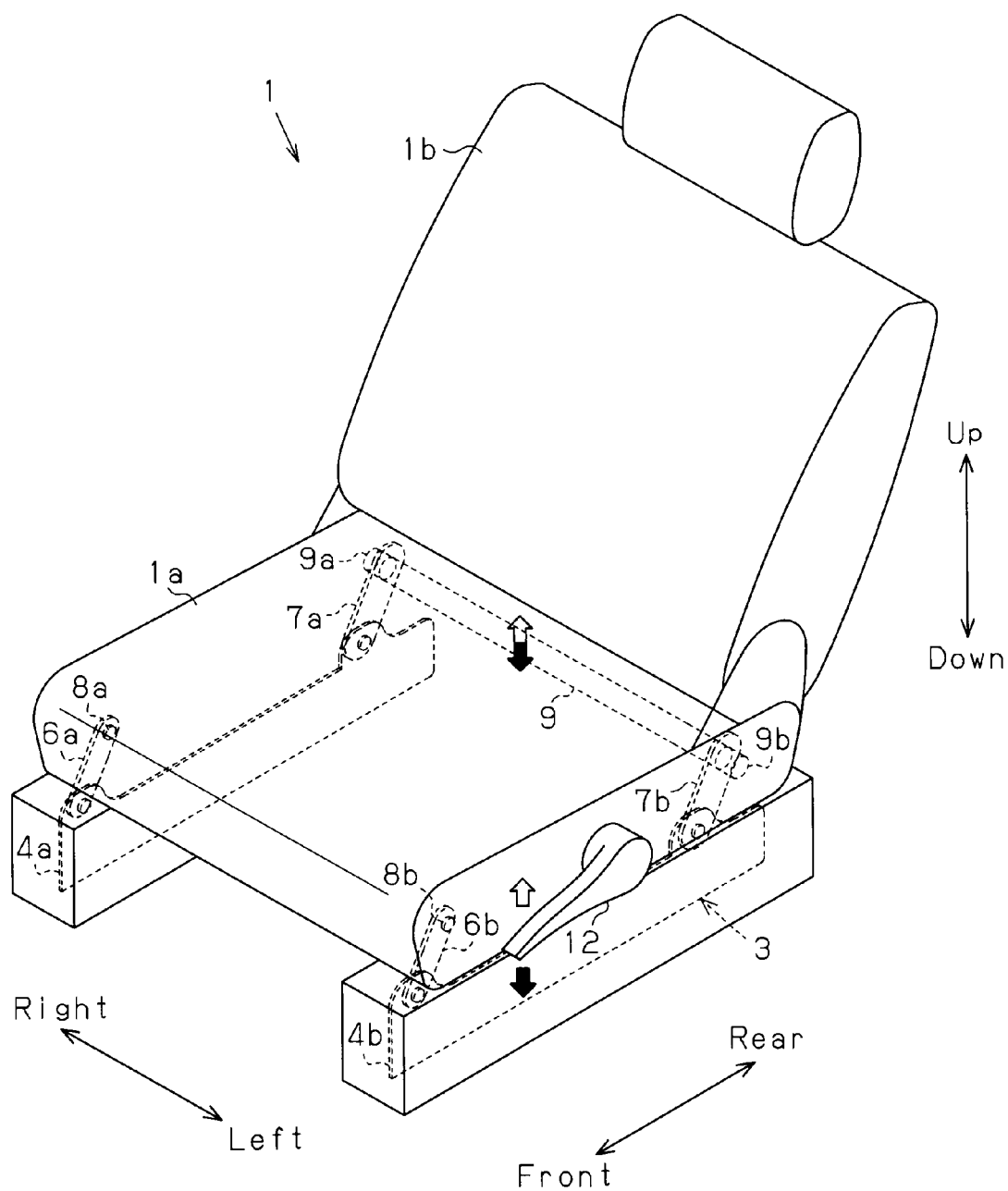
FIG. 1 is a perspective view showing a seat of a vehicle having a vehicle seat adjustment apparatus according to the present invention.
Figure 2:
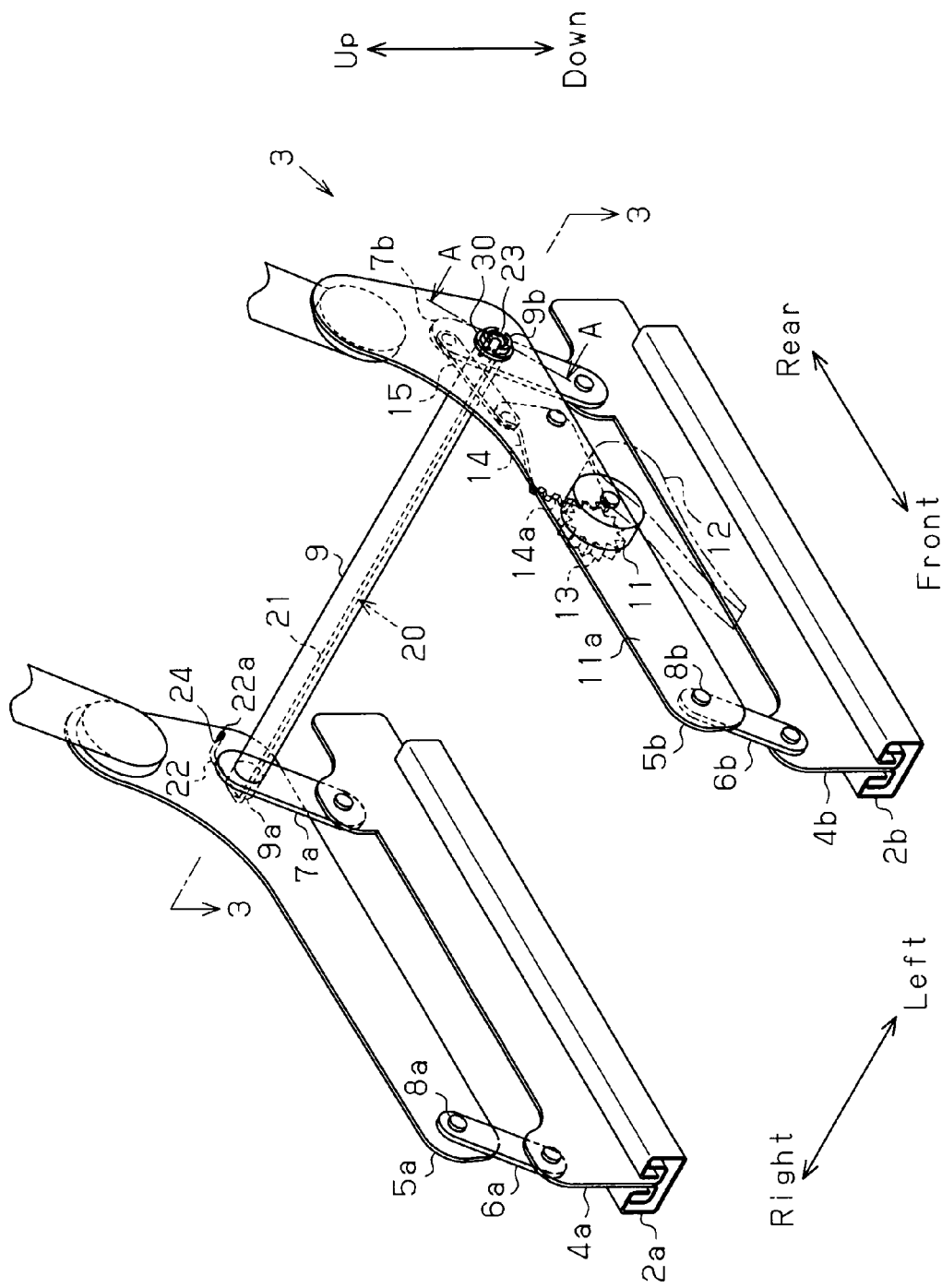
FIG. 2 is a perspective view showing the vehicle seat adjustment apparatus.

As shown in FIGS. 1 and 2, a vehicle seat 1 includes a seat cushion 1a and a seat back 1b, which extends diagonally upward from the rear end of the top surface of the seat cushion 1a. A vehicle seat adjustment apparatus 3 is arranged below the seat cushion 1a to adjust the height of the seating surface of the seat cushion 1a.

As shown in FIG. 2, the vehicle seat 1 extends in the forward-rearward direction with respect to a non-illustrated passenger compartment floor. The seat 1 is supported by a right lower rail 2a and a left lower rail 2b, which forms a pair of lower rails, in a manner slidable in the forward-rearward direction. The right lower rail 2a and the left lower rail 2b are arranged below the seat cushion 1a and spaced from each other at an interval along the direction of the width. The vehicle seat adjustment apparatus 3 includes lifter links 6a, 6b, 7a, 7b, which support the seat cushion 1a. The lifter links 6a, 7a connects a base frame 5a, which forms a framework of the seat cushion 1a, with an upper rail 4a, or a base member arranged above the lower rail 2a. The lifter links 6b, 7b connect a base frame 5b, which forms the framework of the seat cushion 1a, with an upper rail 4b, or a base member arranged above the lower rail 2b.

Specifically, a right upper rail 4a and a left upper rail 4b are slidably secured to an upper portion of the right lower rail 2a and an upper portion of the left lower rail 2b, respectively. The right upper rail 4a is arranged below the right base frame 5a, which forms the framework of the right side portion of the seat cushion 1a. The left upper rail 4b is arranged below a left base frame 5b, which forms the framework of the left side portion of the seat cushion 1a. The right upper rail 4a and the left upper rail 4b are formed of plates having substantially identical shapes. The right front lifter link 6a and the left front lifter link 6b are rotatably secured to an upper front end of the right upper rail 4a and an upper front end of the left upper rail 4b, respectively, through a shaft. The right rear lifter link 7a and the left rear lifter link 7b are rotatably secured to an upper rear end of the right upper rail 4a and an upper rear end of the left upper rail 4b, respectively, through a shaft.

The lower end of the front lifter link 6a is rotatably connected to the front end of the base frames 5a through a pin 8a. The lower end of the front lifter link 6b is rotatably connected to the front end of the base frames 5b through a pin 8b. The upper ends of the rear lifter links 7a, 7b are fixed to corresponding ends of a torque rod 9, which extends along the direction of the width of the seat cushion 1a and has a cylindrical shape. A right end 9a of the torque rod 9 is passed through a right through hole 10a, which extends through a rear portion of the right base frame 5a. A left end 9b of the torque rod 9 is passed through a left through hole 10b, which extends through a rear portion of the left base frame 5b. The right end 9a and the left end 9b project outwardly from the right rear lifter link 7a and the left rear lifter link 7b, respectively. In other words, the torque rod 9 is passed through the through holes 10a, 10b and rotatably supported by the base frames 5a, 5b, each of which serves as a rotation support. The rear lifter links 7a, 7b are pivotally connected to the base frames 5a, 5b through the torque rod 9. The rear lifter links 7a, 7b thus pivot in the forward-rearward direction as the torque rod 9 rotates with respect to the through holes 10a, 10b.

As shown in FIG. 2, a clutch mechanism 11 preventing reverse rotation is provided in the left base frame 5b, which forms the framework of the left side portion of the seat cushion 1a. The clutch mechanism 11 is fixed to an outer side surface 11a of the left base frame 5b. The clutch mechanism 11 connects a rotary shaft of a manipulation lever 12 (see FIG. 1), which is arranged in the left side portion of the seat cushion 1a, to a rotary shaft of a pinion 13 provided in an inner side surface 11b of the left base frame 5b. A sector gear 14 is rotatably supported by the inner side surface 11b of the left base frame 5b. The sector gear 14 is arranged between the pinion 13 and the rear lifter link 7b, which is formed in the rear portion of the left base frame 5b. The sector gear 14 is secured to the base frame 5b at a lower portion of the sector gear 14 through a shaft. A tooth portion 14a, which is meshed with the pinion 13, is formed at the front end of the sector gear 14. An upper portion of the sector gear 14 is connected to the left rear lifter link 7b through a driving link 15.

By pivoting the manipulation lever 12, the sector gear 14 is pivoted through the pinion 13 and the left rear lifter link 7b is thus pivoted in the forward-rearward direction through the driving link 15, which is connected to the sector gear 14. This moves the torque rod 9, thus pivoting the right rear lifter link 7a, which is fixed to the torque rod 9. As the rear lifter links 7a, 7b pivot, the base frames 5a, 5b move, and the front lifter links 6a, 6b, which are connected to the corresponding base frames 5a, 5b, are pivoted in the forward-rearward direction. The seat cushion 1a is thus selectively raised and lowered with respect to the upper rails 4a, 4b through pivoting of the lifter links 6a, 6b, 7a, 7b.

Figure 3:
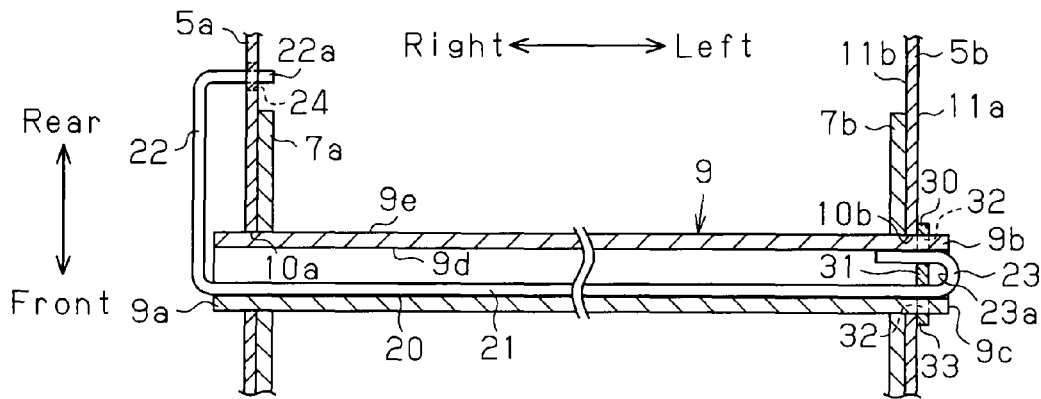
FIG. 3 is a cross-sectional view taken along line 3-3 of FIG. 2.

With reference to FIG. 3, a torsion bar 20 is received in the torque rod 9. The torsion bar 20 is formed by a body 21, a fixing portion 22 serving as a first end, and a coupling portion 23 serving as a second end. The body 21 extends in the axial direction of the torque rod 9. The fixing portion 22 is arranged at the right end of the body 21 and fixed to the base frames 5a, 5b. The coupling portion 23 is provided at the left end of the body 21 and connected to the torque rod 9.

The body 21 of the torsion bar 20 is twisted in such a manner that the lifter links 6a, 6b, 7a, 7b pivot in the direction along which the seat cushion 1a is raised (see FIG. 1). The lifter link near the second end (the coupling portion 23) of the torque rod 9, or the left rear lifter link 7b, is urged by the restoring force of the body 21 to rotate in the rising direction of the seat cushion 1a.

The fixing portion 22 is formed by bending the right end of the body 21 in a substantially U-shaped manner. An engagement hole 24 is formed in the rear of the through hole 10a of the right base frame 5a and extends through the right base frame 5a along the direction of the width of the right base frame 5a. The fixing portion 22 is fixed to the right base frame 5a by passing a distal portion 22a of the fixing portion 22 through the engagement hole 24 and fixing the distal portion 22a.

Figure 4:
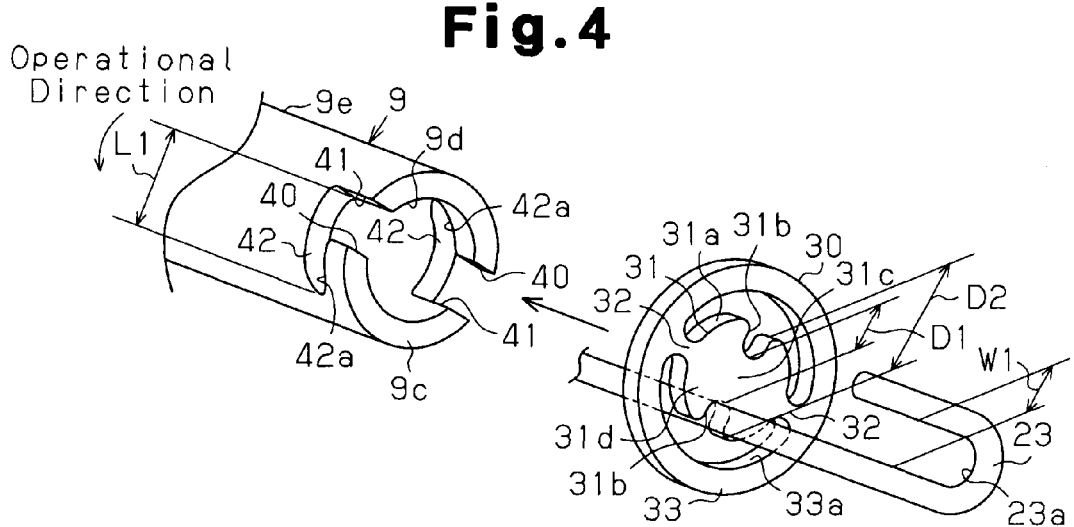
FIG. 4 is an enlarged perspective view showing a portion of the vehicle seat adjustment apparatus.

As illustrated in FIG. 4, the coupling portion 23 has a bent portion 23a, which is bent in a substantially U-shaped manner. The coupling portion 23 can be received in the torque rod 9. The coupling portion 23 is connected to the torque rod 9 through a metal hook member 30, or a coupling member.

As has been described, the torque rod 9 is fixed to the rear lifter links 7a, 7b. Thus, as the rear lifter links 7a, 7b pivot, the torque rod 9 rotates with respect to the base frames 5a, 5b. As a result, by applying torque to the torque rod 9 in such a manner that the torque rod 9 rotates with respect to the base frames 5a, 5b, the torsion bar 20 urges the lifter links 6a, 6b, 7a, 7b (see FIG. 1) so that the lifter links 6a, 6b, 7a, 7b are pivoted in the rising direction of the seat cushion 1a. In the following description, the rotational direction of the torque rod 9 with respect to the base frames 5a, 5b when the seat cushion 1a is raised will be defined as the operating direction.

The metal hook member 30 will now be explained. As illustrated in FIG. 3, the metal hook member 30 is formed by a plate and arranged outside the left base frame 5b and in the vicinity of a distal end of the torque rod 9. The left rear lifter link 7b is fixed to the torque rod 9 at a position inward from the left base frame 5b. The left base frame 5b is arranged between the left rear lifter link 7b and the metal hook member 30. With reference to FIG. 4, the metal hook member 30 has a substantially disk-like first engagement portion 31, second engagement portions 32, 32 extending radially outward from the first engagement portion 31, and a third engagement portion 33 connected to the second engagement portions 32, 32.

The diameter of the first engagement portion 31 is smaller than the inner diameter of the torque rod 9. The first engagement portion 31 is inserted in the torque rod 9 by securing the metal hook member 30 to the torque rod 9. The first engagement portion 31 has a pair of recesses 31b, 31b, which are formed in an outer circumferential surface 31a of the first engagement portion 31. A central portion 31c is arranged between the recesses 31b, 31b. The two recesses 31b, 31b are spaced by the angle of 180 degrees with respect to the axis of the metal hook member 30.

The central portion 31c has a length D1, which is smaller than an opening width W1 of the coupling portion 23 of the torsion bar 20. As the coupling portion 23 of the torsion bar 20 is passed through the recesses 31b, 31b, the central portion 31c of the metal hook member 30 is placed at a position inward from the bent portion 23a of the coupling portion 23 of the torsion bar 20. The coupling portion 23 is urged to pivot in the operating direction by the restoring force of the body 21. This engages the coupling portion 23 of the torsion bar 20 with the central portion 31c of the first engagement portion 31. The length of the body 21 (see FIG. 3) of the torsion bar 20 is greater than the length of the torque rod 9. The metal hook member 30 is inserted through the torque rod 9 from the side corresponding to the coupling portion 23.

Each one of the second engagement portions 32, 32 is arranged at a position spaced from each one of the recesses 31b, 31b, which are formed in the first engagement portion 31, by the angles of 90 degrees. The second engagement portions 32, 32 connect the central portion 31c to the third engagement portion 33. By securing the metal hook member 30 to the torque rod 9, the second engagement portions 32, 32 are received in two slit grooves 40, which extend from a left end surface 9c of the torque rod 9. Thus, as the first engagement portion 31 is urged to pivot in the operating direction, the second engagement portions 32, 32 become engaged with the torque rod 9, thus applying torque to the torque rod 9.

Each of the slit grooves 40 is formed substantially in an L shape and includes a guide portion 41 extending in the axial direction and an accommodating portion 42, which extends circumferentially from the guide portion 41. The accommodating portion 42 accommodates the corresponding one of the second engagement portions 32, 32 after the second engagement portions 32, 32 are moved along the guide portion 41. The accommodating portion 42 has a restriction surface 42a, which is located closer to the distal end of the torque rod 9 than the second engagement portions 32, 32. The restriction surface 42a restricts movement of the corresponding one of the second engagement portions 32 toward the distal end of the torque rod 9. In other words, the metal hook member 30 is engaged with the torque rod 9 at a predetermined position in the axial direction of the torque rod 9. The accommodating portion 42 extends from the guide portion 41 in the operating direction. Through urging of the first engagement portion 31 in the operating direction, movement of the second engagement portions 32, 32 in the direction opposite to the operating direction is restricted. That is, the second engagement portions 32, 32, which are accommodated in the accommodating portions 42 extending in the operating direction, are prevented from moving toward the guide portion 41. This reliably engages the metal hook member 30 with the torque rod 9 in the axial direction of the torque rod 9.

An outer circumferential portion 31d having the outer circumferential surface 31a is formed radially outward from the central portion 31c of the first engagement portion 31. The outer circumferential portion 31d has a diameter D2, which is greater than the maximal length of the slit groove 40 (the length L1 of the accommodating portion 42, in the illustrated embodiment) provided in the inner circumferential surface 9d of the torque rod 9. The outer circumferential portion 31d thus cannot be passed through the slit groove 40. The outer circumferential portion 31d functions as a fourth engagement portion that becomes engaged with the torque rod 9 from a position radially inward from the torque rod 9.

The third engagement portion 33 is formed substantially in an annular shape. The third engagement portion 33 has an outer diameter greater than the diameters of the through holes 10a, 10b of the base frames 5a, 5b and an inner diameter substantially equal to the outer diameter of the torque rod 9. By securing the metal hook member 30 to the torque rod 9, the third engagement portion 33 is arranged along the outer circumference of the torque rod 9. This engages the metal hook member 30 with the left base frame 5b.

The third engagement portion 33 has an arcuate surface 33a, which extends along the outer circumferential surface 9e of the torque rod 9. When the metal hook member 30 is secured to the torque rod 9, the arcuate surface 33a extends along the outer circumferential surface 9e of the torque rod 9.

The illustrated embodiment has the following advantages.

(1) The left base frame 5b and the metal hook member 30, which is provided closer to the distal end of the torque rod 9 than the left base frame 5b, are engaged with each other in the axial direction of the torque rod 9. This prevents the left base frame 5b from moving closer to the distal end of the torque rod 9 than the metal hook member 30. The torque rod 9 is thus prevented from falling off.

(2) The first engagement portion 31 (the central portion 31c) of the metal hook member 30 is located in the space defined by the bent portion 23a of the coupling portion 23. The coupling portion 23 of the torsion bar 20 and a small diameter portion 31c of the first engagement portion 31 are thus engaged with each other along a circumferential direction. This permits engagement between the torsion bar 20 and the torque rod 9 without fixing the torsion bar 20 to the torque rod 9 with adhesive or through welding. The torsion bar 20 and the torque rod 9 are thud easily assembled.

(3) The second engagement portions 32, 32 of the metal hook member 30 are accommodated in the accommodating portions 42 of the slit grooves 40. This engages the metal hook member 30 with the torque rod 9. The left base frame 5b is thus further reliably prevented from moving closer to the distal end of the torque rod 9 than the metal hook member 30.

(4) The third engagement portion 33 is formed in an arcuate shape extending along the outer circumferential surface 9e of the torque rod 9. Thus, when the metal hook member 30 is assembled with the torque rod 9, the metal hook member 30 is easily held from the side corresponding to the outer circumference of the torque rod 9. This facilitates the assembly of the metal hook member 30 with the torque rod 9. Also, the metal hook member 30 is prevented from inclining with respect to the axial direction of the torque rod 9 about the second engagement portions 32, 32 as support points. Further, since the contact area between the torque rod 9 and the metal hook member 30 is increased, rotation torque produced by the torsion bar 20 is further reliably transmitted to the torque rod.

(5) The coupling portion 23 of the torsion bar 20 is accommodated in the recesses 31b, 31b of the first engagement portion 31. This restricts movement of the torsion bar 20 in the radial direction of the first engagement portion 31. The rotational axis of the torsion bar 20 and the center of the metal hook member 30 thus coincide with each other. This prevents the metal hook member 30 from being urged in the radial direction by the restoring force of the torsion bar 20. The torque rod 9 is thus urged to pivot reliably in the operating direction.

(6) The outer circumferential portion 31d of the metal hook member 30 is engaged with the inner circumferential surface of the torque rod 9. This prevents movement of the metal hook member 30 in the radial direction of the torque rod 9. The metal hook member 30 is thus prevented from separating from the slit grooves 40 of the torque rod 9 in the radial direction.

The illustrated embodiment of the present invention may be modified as follows.

Figure 5:
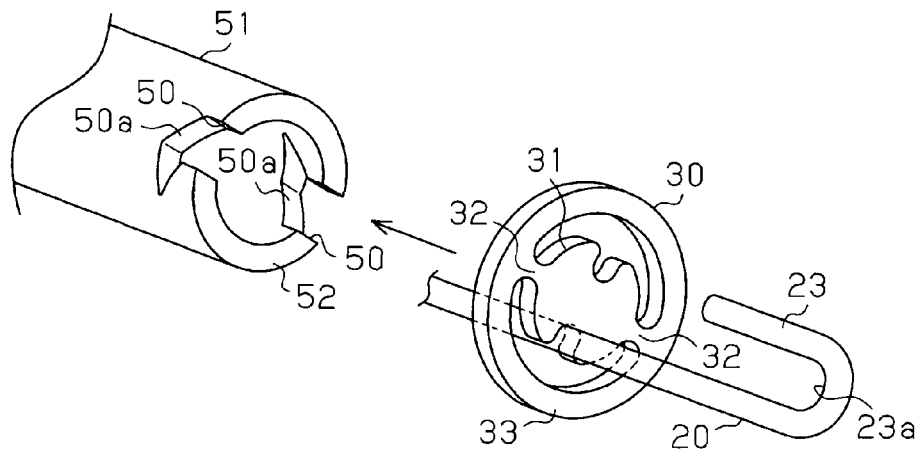
FIG. 5 is a perspective view showing a modified example of the illustrated embodiment.

The shape of each of the slit grooves 40 formed in the end of the torque rod 9 may be modified as needed. For example, as illustrated in FIG. 5, a slit groove 50 may be shaped in such a manner as to become spaced from an end surface 52 along the urging direction of the torsion bar 20. The slit groove 50 has an inclined surface 50a, which contacts the second engagement portions 32, 32 of the metal hook member 30. The inclined surface 50a becomes spaced from the end surface 52 of a torque rod 51 along the operating direction. In this structure, the urging force produced by the torsion bar 20 acts to guide the metal hook member 30 along the inclined surfaces 50a of the slit grooves 50. The metal hook member 30 is thus moved inwardly with respect to the torque rod 9. As a result, the restoring force of the torsion bar 20 prevents the metal hook member 30 from moving closer to the distal end of the torque rod 9.

The torque rod 9 may be supported by the base frames with a separate member such as a bracket. Alternatively, the torque rod 9 may be supported by the upper rails 4a.

In the illustrated embodiment, the recesses 31b, 31b are formed in the first engagement portion 31 to accommodate the coupling portion 23 of the torsion bar 20. However, as long as the first engagement portion 31 is engageable with the torsion bar 20, the first engagement portion 31 may be modified as needed. For example, the first engagement portion may be formed in an elongated shape in such a manner as to connect the second engagement portions, which are arranged along the radial direction, to each other.

In the illustrated embodiment, the coupling portion 23 of the torsion bar 20 is received in the recesses 31b, 31b of the first engagement portion 31. However, such arrangement may be modified as needed, as long as the torsion bar 20 is prevented from moving in the radial direction of the first engagement portion 31.

In the illustrated embodiment, the first engagement portion 31 is shaped in the disk-like shape and has the outer circumferential portion 31d, which has the diameter greater than the length L1 of each slit groove 40 provided in the inner circumferential surface 9d of the torque rod 9. However, the first engagement portion 31 may be modified as needed as long as the first engagement portion 31 is engageable with the torque rod 9 in the radial direction. For example, the first engagement portion may be formed substantially in an H shape as viewed along the axial direction.

In the illustrated embodiment, the two slit grooves 40 are provided in the torque rod 9. However, as long as the second engagement portions 32, 32 and the coupling portion 23 are engaged together through the slit grooves 40, the number of the slit grooves 40 may be altered as needed. Further, the number of the second engagement portions 32, 32 of the metal hook member 30 may be changed as needed in correspondence with the number of the slit grooves 40 formed in the torque rod 9.

In the illustrated embodiment, the third engagement portion 33 is formed in the annular shape. However, the third engagement portion 33 may be modified as needed as long as the third engagement portion 33 is engageable with the left base frame 5b. For example, the third engagement portion 33 is formed in a rectangular shape or in an elongated shape extending substantially perpendicular to the second engagement portions 32, 32. Alternatively, the third engagement portion 33 does not necessarily have to be formed in the annular shape.

In the illustrated embodiment, the length of the body 21 is greater than the length of the torque rod 9. However, such structure may be changed as needed as long as the metal hook member 30, the torque rod 9, and the torsion bar 20 are connected together. For example, a slit may be formed in a right end surface of the torque rod 9 in such a manner as to allow the fixing portion 22 of the torsion bar 20 to slide in the axial direction of the torque rod 9 with respect to the torque rod 9. In this configuration, the coupling portion 23 projects from the left end of the torque rod 9 when the metal hook member 30, the torque rod 9, and the torsion bar 20 are connected together. The metal hook member 30, the torque rod 9, and the torsion bar 20 are thus reliably connected together. Alternatively, the metal hook member 30, the torque rod 9, and the torsion bar 20 are connected together simply by bending the fixing portion 22 after the metal hook member 30 is connected to the torque rod 9, instead of providing a slit or the like.

The invention claimed is:

1. A seat adjustment apparatus of a vehicle, comprising:
two pairs of lifter links that extend along a direction of a width of a seat cushion and are spaced at a predetermined interval in a forward-rearward direction, the lifter links supporting the seat cushion and operating to selectively raise and lower the seat cushion;
a cylindrical torque rod that extends along the direction of the width of the seat cushion, the torque rod being rotatably supported by a rotation support provided in one of the seat cushion and a base member arranged below the seat cushion, the torque rod interlocking the lifter links in one pair of the two pairs of the lifter links with each other;
a torsion bar that is passed through the torque rod and includes a first end and a second end, the first end being fixed to one of the seat cushion and the base member, the torsion bar urging the lifter link corresponding to the second end in a direction in which the seat cushion is raised; and
a coupling member including a first engagement portion passed through the torque rod and engaged with the torsion bar, a second engagement portion received in a slit groove extending from an end surface of the torque rod and engaged with the torque rod, and a third engagement portion arranged at a position radially outward from the second engagement portion and engaged with the rotation support.

2. The seat adjustment apparatus of the vehicle according to claim 1, wherein the second end of the torsion bar is formed substantially in a U shape, the first engagement portion being arranged inside the second end.

3. The seat adjustment apparatus of the vehicle according to claim 1, wherein the slit groove of the torque rod is formed in such a manner as to become engaged with the coupling member.

4. The seat adjustment apparatus of the vehicle according to claim 1, wherein the slit groove of the torque rod is shaped in such a manner as to become spaced from an end surface of the torque rod along an urging direction of the torsion bar.

5. The seat adjustment apparatus of the vehicle according to claim 1, wherein the third engagement portion of the coupling member is formed in an arcuate shape along an outer circumferential surface of the torque rod.

6. The seat adjustment apparatus of the vehicle according to claim 2, wherein the slit groove of the torque rod is formed in such a manner as to become engaged with the coupling member.

7. The seat adjustment apparatus of the vehicle according to claim 2, wherein the slit groove of the torque rod is shaped in such a manner as to become spaced from an end surface of the torque rod along an urging direction of the torsion bar.

8. The seat adjustment apparatus of the vehicle according to claim 2, wherein the third engagement portion of the coupling member is formed in an arcuate shape along an outer circumferential surface of the torque rod.

* * * * *